United States Patent Office 2,824,082
Patented Feb. 18, 1958

2,824,082

PROCESS FOR CURING POLYEPOXIDES AND RESULTING PRODUCTS

Herbert A. Newey, Lafayette, Calif., assignor to Shell Development Company, New York, N. Y., a corporation of Delaware No Drawing. Application October 10, 1955
Serial No. 539,676

14 Claims. (Cl. 260—47)

This invention relates to a process for curing polyepoxides. More particularly, the invention relates to a new process for curing polyepoxides with a special class of amino curing agent, and to the very useful products therefrom.

Specifically, the invention provides a new process for curing and resinifying polyepoxides, and preferably glycidyl polyethers of polyhydric phenols or polyhydric alcohols, which comprises mixing and reacting the polyepoxide with a polyamino-substituted pyridine such as, for example, 2,6-diaminopyridine. The invention further provides hard resinous products obtained by the above-described process.

Polyepoxides, such as those obtained by reacting epichlorohydrin with polyhydric phenols in the presence of caustic, have been cured with various basic substances including some amines. The use of these materials as curing agents, however, has not been entirely satisfactory for certain applications. Known amine curing agents, for example, give resinous products which fail to retain their hardness and strength at elevated temperatures. This limits their use in the preparation of products such as high temperature adhesives and laminated products. In addition, the known curing agents often give products which fail to have the desired degree of resistance to powerful organic solvents such as the aliphatic ketones.

Furthermore, the known amine-polyepoxide mixtures have a relatively short pot life and must be used very shortly after their preparation. This is particularly undesirable for small plant operations where small amounts of the mixture are utilized over an extended period of time.

It is an object of the invention, therefore, to provide a new process for curing polyepoxides. It is a further object to provide a method for curing polyepoxides which gives cured resinous products having improved properties. It is a further object to provide a process for curing polyepoxides which gives products which retain their hardness and strength at elevated temperatures. It is a further object to provide a process for curing polyepoxides which gives product having excellent resistance to powerful organic solvents. It is a further object to provide a method for curing polyepoxides which utilizes a mixture having an unexpectedly long pot life. It is a further object to provide a method for curing polyepoxides which involves the formation of an intermediate soluble and fusible product. It is a further object to provide a process for curing polyepoxides which gives products which are particularly useful in preparation of laminates and high temperature adhesives. Other objects and advantages of the invention will be apparent from the following detailed description thereof.

It has now been discovered that these and other objects may be accomplished by the process of the invention which comprises mixing and reacting the polyepoxide with a polyamino-substituted pyridine. It has been found that these particular amines possess unexpected properties as curing agents in that they cause a rapid cure of the polyepoxides and form insoluble infusible products which retain their hardness and strength at elevated temperatures. In addition, the resulting products have exceptional resistance against the action of powerful organic solvents such as the aliphatic ketones. Compositions containing the polyepoxides and polyamino pyridines also have unexpectedly long pot life and can be stored for many days without setting up to form a resinous product.

The polyamino-substituted pyridines used as curing agents in the process of the invention may be exemplified by 2,6-diamonopyridine, 2,6-diamino-4-methylpyridine, 2,6-diamino-4-isobutylpyridine, 2,5-diaminopyridine, 2,4-diamino-5-ethylpyridine and 2,5-diamino-4-isopropylpyridine and the like. Particularly preferred polyamino-substituted pyridines include the diaminopyridines and the diamino-alkylpyridines wherein the alkyl group contains no more than 6 carbon atoms.

According to the process of the invention, the polyamino-substituted pyridine is mixed and reacted with the polyepoxide whereby there is formed a resinous product. Although reaction of the mixture occurs slowly at temperatures as low as about 20° C., conversion to hard tough solvent-resistant resinous product is effected generally at about 50° C. to 280° C., excellent results being obtained from about 90° C. to 200° C., particularly from about 100° C. to 175° C.

Resinification of the mixture of the polyepoxide and the amine occurs in several stages. Upon the polyamino-substituted pyridine reacting with the polyepoxide, there is first formed a resinous product which is fusible and soluble in acetone. Continued curing then gives the final resinous product which is characterized by being hard and infusible. At elevated curing temperatures, the different stages of cure flow from one to the other without interruption. However, it is often useful to arrest the curing reactions before infusibilization occurs. This is accomplished by cooling below a temperature of about 40° C. Although the fusible resinous product does not appear to have indefinite life in the state of fusibility at such low temperature, it does remain readily fusible for a number of weeks when kept at about 20° C. to 25° C., and it also remains soluble in acetone during this period. This unique property of the fusible resinous product along with its normally solid, non-tacky character makes it very useful.

Although it is desirable to mix the polyamino-substituted pyridine with the polyepoxide in such proportions that there is present about 0.25 mol of the polyamine per epoxide equivalent weight of the polyepoxide, the proportions may be varied widely. Thus, in general, there is used about 0.15 to 0.75 mol of the polyamine per epoxide equivalent weight of the polyepoxide, and the preferred proportion of the diamine mixed with the polyepoxide is such that there is present from 0.2 to 0.4 mol of polyamine per epoxide equivalent weight of the polyepoxide.

In executing the process of the invention, it is desirable to have the polyepoxide in a mobile liquid condition when the polyamino-substituted pyridine curing agent is added in order to facilitate mixing. The polyepoxides are generally viscous to solid materials at ordinary temperature. With those that are liquid, but too viscous for readily mixing, they are either heated to reduce the viscosity, or have a liquid solvent added thereto in order to provide fluidity. Normally solid members are likewise either melted or mixed with a liquid solvent. Various solvents are suitable for achieving fluidity of the polyepoxides. These may be volatile solvents which escape from the polyether compositions containing the diamine by evaporation before or during the curing such as ketones like acetone, methyl ethyl ketone, methyl isobutyl ketone, isophorone, etc., esters such as ethyl acetate, butyl acetate, Cellosolve acetate (ethylene glycol monoacetate), methyl Cellosolve acetate (acetate of ethylene glycol monomethyl ether), etc.; ether alcohols such as methyl, ethyl or butyl ether of ethylene glycol or diethylene glycol; chlorinated hydrocarbons such as trichloropropane, chloroform, etc. To save expense, these active solvents may be used in admixture with aromatic hydrocarbons such as benzene, toluene, xylene, etc., and/or alcohols such as ethyl, isopropyl or n-butyl alcohol. Solvents which remain in the cured compositions may also be used, such as diethylphthalate, or liquid mono-epoxy compounds including glycidyl allyl ether, glycidyl phenyl ether, styrene oxide, and the like, as well as cyano-substituted hydrocarbons, such as acetonitrile. It is also convenient to employ a glycidyl polyether of the dihydric phenol in admixture with a normally liquid glycidyl polyether of a polyhydric alcohol.

The polyamino pyridines may also be pre-reacted with mono-epoxides, preferably in a mol to mol ratio, to form adducts which are particularly superior curing agents.

Various other ingredients may be mixed with the glycidyl polyether subjected to cure with the polyamino pyridine including pigments, fillers, dyes, plasticizers, resins and the like.

The polyamino pyridines may also be used in combination with other curing agents, such as aliphatic polyamines, polycarboxylic acids and anhydrides, $BF_3$ and its complexes, e. g., amine complexes, and polythiols.

One important application of the invention is the production of laminates or resinous articles reinforced with fibrous textiles. Although it is generally preferred to utilize glass cloth for this purpose, any of the other suitable fibrous materials in sheet form may be employed such as glass matting, paper, asbestos paper, mica flakes, cotton bats, duck muslin, canvas and the like.

In preparing the laminate, the sheets of fibrous material are first impregnated with the mixture of glycidyl polyether and polyamino pyridine. This is accomplished by dissolving the diamine in acetone and mixing the solution with the polyether so as to obtain a fluid mixture. The sheets of fibrous material are impregnated with the mixture by spreading it thereon or by dipping or otherwise immersing them in the impregnant. The solvent is conveniently removed by evaporation and the mixture is cured to the fusible resin stage. Although this operation may be conducted at room temperature (20 to 25° C.), it is preferred to use somewhat elevated temperature such as about 50° C. to 200° C. with the impregnated sheet stock passing through or hanging free in an oven or other suitable equipment. The resinification is arrested before infusible product occurs by cooling below about 40° C., preferably to about 20 to 25° C. A plurality of the impregnated sheets are then superposed and the assembly is cured in a heated press under a pressure of about 25 to 500 or more pounds per square inch. The resulting laminate is extremely strong and resistant against the action of organic and corrosive solvents.

Another important use of the invention is the production of molded articles. A molding powder is first prepared by milling together a mixture of a glycidyl polyether and polyamino pyridine diamine along with customary fillers and mold release agents. Usually the milled mixture is set up so that the fusible resin is contained therein. The milled mixture is then ground and molded articles are prepared therefrom with conversion of the fusible resin into the infusible state with use of molding machines such as those for compression molding or transfer molding. If desired, the fusible milled mixture may be prepared in pre-form pellets and the like.

The polyepoxides to be used in the process of the invention include those organic compounds containing a plurality of epoxy groups, i. e.,

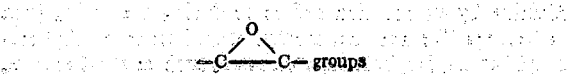

These compounds may be saturated or unsaturated, aliphatic, cycloaliphatic, aromatic or heterocyclic and may be substituted if desired with substituents, such as chlorine atoms, hydroxyl groups, ether radicals, and the like. They may also be monomeric or polymeric.

For clarity, many of the polyepoxides and particularly those of the polymeric type in terms of epoxy equivalent value. The meaning of this expression is described in U. S. 2,633,458.

If the polyepoxide material consists of a single compound and all of the epoxy groups are intact, the epoxy equivalency will be integers, such as 2, 3, 4 and the like. However, in the case of the polymeric type polyepoxides many of the materials may contain some of the monomeric monoepoxides and/or contain macromolecules of somewhat different molecular weight so the epoxy equivalent values may be quite low and contain fractional values. The polymeric material may, for example, have epoxy equivalent values, such as 1.5, 1.8, 2.5, and the like.

Various examples of polyepoxides that may be used in the process of the invention are given in U. S. 2,633,458 and it is to be understood that so much of the disclosure of that patent relative to examples of polyepoxides is incorporated by reference into this specification.

A group of polyepoxides which are not specifically illustrated in the above patent but are of particular value in the process of the invention are the glycidyl ethers of novalac resins which resins are obtained by condensing an aldehyde with a polyhydric phenol. A typical member of this class is the epoxy resin from formaldehyde 2,2-bis(5-hydroxyphenol) propane novalac resin which contains as predominant constituent the substance represented by the formula

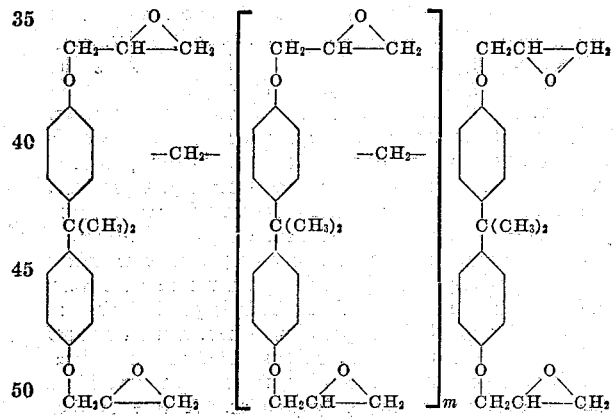

Another group of preferred polyepoxides comprise the glycidyl ethers of alpha,alpha,omega,omega-tetrakis(hydroxyaryl) alkanes as described and claimed in Schwarzer, Serial No. 466,208, filed November 1, 1954.

To illustrate the manner in which the invention may be carried out, the following examples are given. It is to be understood, however, that the examples are for the purpose of illustration and the invention is not to be regarded as limited to any of the specific materials or conditions recited therein.

*Example 1*

This example illustrates the use of 2,6-diaminopyridine as a curing agent for Polyether A.

100 parts of Polyether A and 14 parts of 2,6-diaminopyridine were mixed together and the mixture heated at 100° C. for 8 hours and then ½ hour at 250° C. The resulting casting had a Barcol hardness of 12 at 120° C. The casting also had excellent resistance to sovents such as acetone. The mixture of Polyether A and 2,6-diaminopyridine had a pot life of 9½ days. A similar composition cured with meta-phenylene diamine as curing agent had a Barcol hardness of only 6 at 120° C. and a pot life of 9½ hours.

Example II

This example illustrates the use of 2,6-diaminopyridine as a curing agent for Polyether D.

100 parts of Polyether A and 15 parts of 2,6-diaminopyridine were mixed with xylene and Cellosolve acetate (50:50). This mixture was then spread on steel panels and baked for 30 minutes at 150° C. The resulting films were extremely hard and had good flexibility and good resistance to acetone.

Example III

This example illustrates the use of 2,6-diaminopyridine as a curing agent for a glycidyl polyether of a phenol-formaldehyde resin having an epoxiy value of 0.463 eq./100 g. and a mol wt. of 1126 in the preparation of a glass cloth laminate.

100 parts of the polyglycidyl ether were combined with 4 parts of 2,6-diamino-pyridine and the mixture combined with acetone to form a 60% solids solution. Sheets of fiber glass cloth were impregnated with the solution and the cloth dried for 30 to 50 minutes at 90° C. Assemblies of 12 piles of superposed impregnated cloth were then prepared. The assemblies were cured in a press operating at 310° F. A curing cycle was used wherein the assembly was first subjected to mere contact pressure for a minute or so and then the pressure was increased to 25 p. s. i. The product was then cured at 400° F. for several hours.

Some of the properties of the laminate are given below:

Flexural, ult., p. s. i. _____ 74,400
   Mod. ×10⁻⁶ _____ 3.2
Flexural at elevated temperatures:
   At 160° F. after ½ hour at 160° F., ult.,
    p. s. i. _____ 67,700
   Mod.×10⁻⁶ _____ 2.8
Tensile, ult., p. s. i. _____ 52,300
Tensile at elevated temperatures:
   At 300° F. after ½ hour at 300° F., ult.,
    p. s. i. _____ 44,000
   At 500° F. after ½ hour at 500° F., ult.,
    p. s. i. _____ 35,600
   At 500° F. after 200 hours at 500° F., ult.,
    p. s. i. _____ 31,700
Compressive, ult., p. s. i. _____ 68,800
Compressive at elevated temperatures:
   At 300° F. after ½ hour at 300° F., ult.,
    p. s. i. _____ 27,000
   At 500° F. after ½ hour at 500° F., ult.,
    p. s. i. _____ 9,500
   At 500° F. after 200 hours at 500° F., ult.,
    p. s. i. _____ 10,900
Flammability _____ Self-ext.
Water absorption, 24 hours, percent _____ +0.15
Rockwell M hardness _____ 116
Barcol hardness _____ 71
Specific gravity _____ 1.81
Resin content, percent _____ 35

Related laminates were prepared wherein the amount of curing agent was varied. Some of the properties of the laminates are shown below:

| Conc. Curing Agent, PHR | Pre-cure [a] in min. | Post-cure, Hrs. at 400° F. | Flexural Strength ||||||
|---|---|---|---|---|---|---|---|---|
| | | | Room Temp. || 300° F.[b] || 500° F.[b] ||
| | | | Ult., p. s. i. | Mod. ×10⁻⁶ | Ult., p. s. i. | Mod. ×10⁻⁶ | Ult., p. s. i. | Mod. ×10⁻⁶ |
| 6 | 5 | 1 | 82,600 | 3.4 | 23,400 | 2.1 | 22,100 | 2.4 |
| 6 | 5 | 0 | 73,000 | 3.5 | 7,000 | 1.0 | 17,600 | 2.1 |
| 8 | 5 | 0 | 83,700 | 3.8 | 15,500 | 1.9 | 20,300 | 2.4 |
| 8 | 5 | 1 | 71,900 | 3.5 | 51,400 | 2.9 | 23,900 | 2.6 |
| 10 | 5 | 0 | 84,500 | 3.7 | 29,500 | 2.3 | 23,300 | 2.3 |
| 10 | 5 | 1 | 77,000 | 3.4 | 56,900 | 2.9 | 24,000 | 2.4 |
| 12 | 5 | 0 | 73,500 | 3.5 | 46,500 | 2.6 | 18,900 | 2.0 |
| 12 | 5 | 1 | 70,900 | 3.3 | 57,600 | 2.9 | 21,500 | 2.2 |
| 14 | 5 | 0 | 63,000 | 3.3 | 43,400 | 2.6 | 15,700 | 1.8 |
| 14 | 5 | 1 | 58,500 | 3.1 | 45,600 | 2.7 | 15,800 | 1.8 |
| 14 | 3 | 0 | 84,700 | 3.7 | 46,100 | 2.8 | 20,900 | 2.5 |
| 14 | 5 | 0 | 77,200 | 3.5 | 44,200 | 2.4 | 20,400 | 2.2 |
| 14 | *3 | 0 | 79,700 | 3.6 | 45,500 | 2.5 | 21,100 | 2.3 |
| 14 | 3 | 0 | 77,700 | 3.8 | 38,400 | 1.5 | 24,000 | 2.4 |
| 16 | 5 | 0 | 66,600 | 3.3 | 47,300 | 2.6 | 9,900 | 1.4 |
| 16 | 5 | 1 | 61,500 | 3.1 | 46,300 | 2.6 | 11,300 | 1.3 |

[a] Laminates were cured 30 minutes at 310° F.
[b] After ½ hour at test temperature.
* Stored 64 hours at room temperature before laminating.

Example IV

This example illustrates the use of 2,6-diaminopyridine as curing agent for a glycidyl ether of bisphenol-A (Polyether A) in U. S. 2,633,458 in the preparation of a glass cloth laminate.

100 parts of Polyether A was combined with 14 parts of 2,6-diaminopyridine and the mixture combined with acetone to form a 60% solids solution. Sheets of fiberglass cloth 181-Volan A were impregnated by painting the solutions on the cloth and then drying them for 30 to 50 minutes at 90° C. while hanging free in an air oven to form non-tacky sheets. This treatment resinified the polyether to a fusible product. Assemblies of 12 piles of superposed impregnated cloth were then prepared. The assemblies were cured in a press operating at 345° F. A curing cycle was used wherein the assembly was first subjected to mere contact pressure for 5 minutes and then the pressure was increased to 25 p. s. i. for 25 minutes. Post cure was as indicated in the table. The ultimate flexural strength and modulus of elasticity in bending according to ASTM Designation D790-49T of the resulting laminates are shown below.

| Postcure, Hrs. at 400° F. | Flexural Strength ||||||
|---|---|---|---|---|---|---|
| | Room Temp. || 300° F.[a] || 500° F.[a] ||
| | Ult., p. s. i. | Mod. ×10⁻⁶ | Ult., p. s. i. | Mod. ×10⁻⁶ | Ult., p. s. i. | Mod. ×10⁻⁶ |
| 0 | 84,000 | 3.6 | 15,600 | 2.0 | 4,600 | 0.8 |
| 0 | 84,200 | 3.8 | 14,700 | 1.9 | 5,700 | 0.7 |
| 0 | 85,500 | 3.7 | 13,000 | 1.9 | 5,700 | 0.7 |
| 1 | 84,200 | 3.9 | 17,100 | 2.4 | 7,200 | 0.9 |
| 1 | 81,200 | 3.7 | 14,800 | 1.9 | 7,800 | 1.1 |
| 3 | 84,100 | 3.6 | 18,100 | 2.1 | 7,500 | 0.8 |
| 3 | 81,700 | 3.6 | 15,600 | 1.7 | 7,900 | 0.8 |
| 3 | 85,700 | 3.6 | 15,700 | 1.9 | 6,400 | 0.9 |
| 24 | 83,800 | 3.7 | 15,200 | 1.6 | 4,900 | 0.9 |
| 24 | 80,000 | 3.7 | 12,000 | 1.5 | 6,500 | 0.6 |

[a] After ½ hour at test temperature.

Example V

This example illustrates the use of 2,6-diaminopyridine as curing agent for a polyglycidyl ether of resorcinol having an epoxy value of .800 eq./100 g. in the preparation of a glass cloth laminate.

100 parts of the glycidyl ether of resorcinol was combined with 21 parts of 2,6-diaminopyridine and the mixture combined with acetone to form a 60% solids solution. Sheets of fiberglass cloth 181-Volan A were impregnated by painting the solutions on the cloth and then drying them for 30 to 50 minutes at 90° C. while hanging free in an air oven to form non-tacky sheets. This treatment resinified the polyether to a fusible product. Assemblies of 12 piles of superposed impregnated cloth were then prepared. The assemblies were cured in a press at 400° C. with 2 minutes at contact pressure, and 25 minutes at 25 p. s. i. The ultimate flexural strength of the resulting laminates were determined and are reported in the table below:

FLEXURAL STRENGTH

| Room Temp. | | 300° F.ᵃ | |
|---|---|---|---|
| Ult., p. s. i. | Mod. ×10⁻⁶ | Ult., p. s. i. | Mod. ×10⁻⁶ |
| 102,000 | 4.0 | 13,500 | 1.7 |

ᵃ After ½ hour at test temperature.

Example VI

This example illustrates the use of a mixture of m-phenylene diamine and 2,6-diaminopyridine as a curing agent for the polyglycidyl ether of a phenol-formaldehyde resin described in Example I in the preparation of a glass cloth laminate.

100 parts of the polyglycidyl ether was combined with 4.5 parts of 2,6-diaminopyridine and 1.5 part of m-phenylene diamine and the mixture combined with acetone to form a 60% solids solution. Sheets of fiberglass cloth 181-Volan A were impregnated by painting the solutions on the cloth and then drying them for 30 to 50 minutes at 90° C. while hanging free in an air oven to form non-tacky sheets. This treatment resinified the polyether to a fusible product. Assemblies of 12 piles of superposed impregnated cloth were then prepared. The assemblies were cured in a press operated at 400° C. A curing cycle was used wherein the assembly was first subjected to mere contact pressure for a minute or so and then the pressure was increased to 200 pounds per square inch. The ultimate flexural strength and modulus of elasticity in bending of the resulting laminates were determined. The results are shown in the following table:

| Conc. meta-phenyl-ene di-amine, PHR | Conc. 2 6-diamino pyri-dine, PHR | Percent Resin ᵇ | Flexural Strength | | | | | |
|---|---|---|---|---|---|---|---|---|
| | | | Room Temp. | | 300° F.ᵃ | | 500° F.ᵃ | |
| | | | Ult., p. s. i. | Mod. ×10⁻⁶ | Ult., p. s. i. | Mod. ×10⁻⁶ | Ult., p. s. i. | Mod. ×10⁻⁶ |
| 1 | 3 | 39-35 | 82,700 | 3.4 | 13,100 | 1.4 | 10,200 | 1.7 |
| 1.5 | 4.5 | 39-35 | 79,700 | 3.3 | 39,300 | 2.2 | 19,100 | 2.3 |

ᵃ After ½ hour at the indicated temperature.
ᵇ Before and after curing, respectively.

Example VII

This example illustrates the use of 2,6-diaminopyridine as curing agent for a glycidyl ether of Bis-phenol-A (Polyether D of U. S. 2,633,458) in the preparation of a glass cloth laminate.

100 parts of Polyether D and 5 parts of 2,6-diaminopyridine were combined and heated at 90° C. The mixture was then combined with acetone to form a 60% solids solution. Sheets of fiberglass cloth were impregnated with the solution and the cloth dried for 30 to 50 minutes at 90° C. Assemblies of 12 piles of superposed impregnated cloth were then prepared. The assemblies were cured in a press at 400° C. with 2 minutes at contact pressure and 25 minutes at 25 p. s. i. The ultimate flexural strength of the laminates is shown in the table below:

| Test Temperature | Flexural, ult., p. s. i. |
|---|---|
| Room | 97,000 |

Example VIII

This example illustrates the use of 2,6-diaminopyridine as curing agent for a polyglycidyl ether of 1,1,2,2-tetrakis (hydroxyphenyl) ethane (Example 1 of Serial No. 466,208, filed November 1954) in the preparation of a glass cloth laminate.

100 parts of the polyglycidyl ether was combined with 2,6-diaminopyridine in the proportions shown in the table and the mixture combined with acetone to form a 60% solids solution. Sheets of fiberglass cloth were impregnated with these solutions and then dried for 30 to 50 minutes at 90° C. Assemblies of 12 piles of superposed impregnated cloth were then prepared. The assemblies were cured in a press operating at 310° F. A curing cycle was used wherein the assembly was first subjected to mere contact pressure for a minute or so and then the pressure was increased to 25 p. s. i. for 30 minutes. The ultimate flexural strength and modulus of elasticity are shown in the following table:

| Lami-nate No. | Conc. 2,6-di-amino pyri-dine, PHR | Precure, min.ᵃ | Postcure, Hr. 400° F. | Percent Resin ᶜ | Flexural Strength | | | | | |
|---|---|---|---|---|---|---|---|---|---|---|
| | | | | | Room Temp. | | 300° F.ᵇ | | 500° F.ᵇ | |
| | | | | | Ult., p. s. i. | Mod. ×10⁻⁶ | Ult., p. s. i. | Mod. ×10⁻⁶ | Ult., p. s. i. | Mod. ×10⁻⁶ |
| 1543.1 | 4 | 6 | 1 | 36-29 | 83,500 | 3.3 | 57,700 | 2.7 | 28,500 | 2.6 |
| 1542 | 6 | 6 | 0 | 38-33 | 80,700 | 3.6 | 24,400 | 3.1 | 27,900 | 2.8 |
| 1544 | 8 | 6 | 0 | 38-34 | 87,700 | 3.3 | 52,900 | 3.2 | 33,000 | 2.5 |
| 1545 | 12 | 4 | 0 | 38-32 | 86,000 | 3.5 | 64,300 | 3.8 | 28,900 | 2.6 |
| 1546 | 16 | 4 | 0 | 39-33 | 86,700 | 3.3 | 69,400 | 3.6 | 19,100 | 2.1 |

ᵃ Laminates were cured 30 minutes at 310° F.
ᵇ After ½ hour at the indicated temperature.
ᶜ Before and after curing, respectively.

Example IX

This example illustrates the use of 2,6-diamino-4-methylpyridine as a curing agent for the glycidyl ether described in the preceding example in the preparation of a glass cloth laminate.

100 parts of the glycidyl ether were combined with 30 parts of 2,6-diamino-4-methylpyridine and the mixture combined with acetone to form a 60% solids solution. Sheets of fiberglass cloth were impregnated with the solution and cured as in the preceding example. The resulting laminate had room temperature flexural strength of 81,600 p. s. i. and strength at 300° F. of 61,500 p. s. i.

Example X

This example illustrates the use of 2,6-diamino-4-methylpyridine as a curing agent for Polyether A in preparing a glass cloth laminate.

100 parts of Polyether A were combined with 20 parts of 2,6-diamino-4-methylpyridine and the mixture combined with acetone to form a 60% solids solution. Sheets of fiberglass cloth were impregnated with the solution and cured as in Example VIII. The resulting laminate had room temperature flexural strength of 87,700 p. s. i.

Example XI

This example illustrates the use of 2,6-diaminopyridine as a curing agent for a polyglycidyl ether of a bis-phenol-formaldehyde resin having an epoxy value of 0.463 eq./100 g. in the preparation of a glass cloth laminate.

100 parts of the glycidyl ether of the bis-phenol-formaldehyde resin were combined with 2,6-diaminopyridine in the amount indicated in the table and the mixture combined with acetone to form a 60% solids solution. Sheets of fiberglass cloth were impregnated with the solution and cured for 30 minutes at 155° C., 25 p. s. i. and post cured as indicated. The flexural strength of the sheets are shown in the table below:

| Conc. 2,6-diamino vinylpyridine, PHR | Precure,[a] min. | Percent Resin [b] | Postcure, hrs. at 400° F. | Flexural Strength | | | | | |
|---|---|---|---|---|---|---|---|---|---|
| | | | | Room temp. | | 300° F.[c] | | 500° F.[c] | |
| | | | | Ult., p. s. i. | Mod. ×10⁻⁶ | Ult., p. s. i. | Mod. ×10⁻⁶ | Ult., p. s. i. | Mod. ×10⁻⁶ |
| 4 | 3 | 33-27 | 0 | 73,300 | 3.5 | 5,400 | 0.6 | 9,500 | 1.5 |
| 6 | 3 | 33-28 | 0 | 81,600 | 3.8 | 11,300 | 1.4 | 13,800 | 1.8 |
| 8 | 3 | 33-29 | 0 | 81,600 | 3.7 | 28,300 | 2.1 | 17,400 | 2.3 |
| 12 | 2 | 32-27 | 0 | 80,500 | 3.6 | 61,000 | 3.0 | 17,000 | 2.2 |

[a] All laminates were cured 30 minutes at 155° C., 25 p. s. i.
[b] Before and after curing.
[c] After ½ hour at test temperature.

I claim as my invention:

1. A process for producing a resinified product which comprises mixing and reacting a polyepoxide having

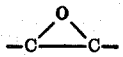

epoxy equivalency greater than 1.0 with a polyamino-substituted pyridine of the group consisting of diaminopyridines and diaminoalkylpyridines wherein the alkyl group contains from 1 to 6 carbon atoms.

2. The resinous product obtained according to the process of claim 1.

3. A process as in claim 1 wherein the curing agent is 2,6-diaminopyridine.

4. A process for producing a resinified product which comprises mixing and reacting a glycidyl polyether of a polyhydric phenol having a 1,2-epoxy equivalency between 1.0 and 2.0 with a polyamino-substituted pyridine of the group consisting of diaminopyridines and diaminoalkylpyridines wherein the alkyl group contains from 1 to 6 carbon atoms in amount of about 0.15 to 0.75 mol of the polyamino-substituted pyridine per epoxide equivalent weight of the polyether, and curing the mixture at about 50° C. to 280° C. to a hard resinous product.

5. A process as in claim 4 wherein the curing agent is 2,6-diaminopyridine.

6. A process as in claim 4 wherein the curing agent is a mixture of 2,3- and 2,5-diaminopyridine.

7. A process as in claim 4 wherein the curing agent is 2,6-diamino-4-methylpyridine.

8. A process for producing a resinified product which comprises mixing and reacting a glycidyl polyether of 2,2-bis(4-hydroxyphenyl) propane having a 1,2-epoxy equivalency between 1.0 and 2.0 and an epoxide equivalent weight of about 175 to 600 with a diaminopyridine, in amount of about 0.12 to 0.5 mol of the diamine per epoxide equivalent weight of the polyether.

9. A process for producing a resinified product which comprises commingling 2,6-diaminopyridine with a glycidyl polyether of 2,2-bis(4-hydroxyphenyl) propane in amount of about 0.2 to 0.4 mol of the diamine per epoxide equivalent weight of the polyether, and curing the mixture at about 100° C. to 175° C. to a hard resinous product.

10. The hard resinous product obtained by the process of claim 9.

11. A process for producing a resinified product which comprises the steps of mixing and reacting a diaminopyridine with glycidyl polyether of a polyhydric phenol having a 1,2-epoxy equivalency greater than 1.0 in amount of about 0.2 to 0.4 mol of the diamine per epoxide equivalent weight of the polyether arresting the curing of the mixture before it becomes infusible by cooling to a temperature below about 40° C., and subsequently completing the cure of the fusible product by heating it at about 90° C. to 200° C. until a hard infusible resinous product is obtained.

12. The hard infusible resinous product obtained by the process of claim 11.

13. A heat curable composition comprising a polyepoxide having

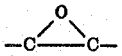

epoxy equivalency greater than 1.0 and a polyamino-substituted pyridine of the group consisting of diaminopyridines and diaminoalkylpyridines wherein the alkyl group contains from 1 to 6 carbon atoms.

14. A heat curable composition comprising a polyglycidyl ether of a polyhydric phenol having an epoxy equivalency greater than 1.0 and 2,6-diaminopyridine.

References Cited in the file of this patent
UNITED STATES PATENTS 2,682,515    Naps ---------------- June 29, 1954